United States Patent
Kenney

(10) Patent No.: US 10,076,949 B1
(45) Date of Patent: Sep. 18, 2018

(54) VEHICLE SUN SHIELD

(71) Applicant: Cindy L. Kenney, Dallas, TX (US)

(72) Inventor: Cindy L. Kenney, Dallas, TX (US)

( * ) Notice: Subject to any disclaimer, the term of this patent is extended or adjusted under 35 U.S.C. 154(b) by 0 days.

(21) Appl. No.: 15/079,943

(22) Filed: Mar. 24, 2016

Related U.S. Application Data

(60) Provisional application No. 62/141,357, filed on Apr. 1, 2015.

(51) Int. Cl.
  *B60J 3/00* (2006.01)
  *A45B 11/00* (2006.01)
  *A45B 25/02* (2006.01)
  *A45B 23/00* (2006.01)

(52) U.S. Cl.
  CPC .............. *B60J 3/00* (2013.01); *A45B 11/00* (2013.01); *A45B 23/00* (2013.01); *A45B 25/02* (2013.01)

(58) Field of Classification Search
  CPC ......... A45B 23/00; A45B 11/00; A45B 25/18; A45B 25/02; A45B 2023/0006; A45B 2023/0093; B60J 3/02; B60J 3/00; B60J 3/0204; B60J 1/00
  USPC ........ 135/16, 25.1, 25.4, 33.2, 88.05, 88.09; 296/97.6, 97.8, 84.1, 91
  See application file for complete search history.

(56) References Cited

U.S. PATENT DOCUMENTS

| | | | | |
|---|---|---|---|---|
| 2,736,375 A | * | 2/1956 | Rupert | B60J 11/08 135/19.5 |
| 4,095,835 A | * | 6/1978 | Ensor | B62D 35/001 105/1.2 |
| 4,934,394 A | * | 6/1990 | Hermanson | A45B 19/00 135/19.5 |
| 4,962,780 A | * | 10/1990 | Engdahl | A45B 25/18 135/16 |
| 5,214,872 A | * | 6/1993 | Buyalos, Jr. | A01M 31/00 135/75 |
| 5,355,903 A | * | 10/1994 | Haddad | A45B 11/00 135/20.1 |
| 5,551,464 A | * | 9/1996 | Kelly | A45B 25/18 135/33.2 |
| 6,089,245 A | * | 7/2000 | Tseytlin | E04H 15/48 135/117 |
| 6,095,230 A | * | 8/2000 | Mitchell | B60J 1/2091 160/370.21 |
| 6,116,256 A | * | 9/2000 | Pawsey | A45B 19/00 135/120.3 |
| 6,296,005 B1 | * | 10/2001 | Williams | A01M 31/025 135/901 |
| 6,904,923 B2 | * | 6/2005 | Chai | B60J 1/2011 135/21 |
| 7,216,917 B2 | * | 5/2007 | Tadakamalla | B60J 1/2016 296/97.11 |

(Continued)

FOREIGN PATENT DOCUMENTS

JP  06297945 A * 10/1994 ............... B60J 3/00

*Primary Examiner* — Winnie S Yip
(74) *Attorney, Agent, or Firm* — Kenneth L Tolar

(57) ABSTRACT

A vehicle sun shield includes an elongated shaft having a collar slidably mounted thereon that expands a plurality of support ribs and an overlaying, reflective canopy. Accordingly, a user adjusts a handle mechanism at a lower end of the shaft to a desired length and fully expands the canopy. The canopy is positioned immediately adjacent to the windshield interior with the handle resting on the vehicle console or on the upper surface of the dashboard.

8 Claims, 2 Drawing Sheets

(56) References Cited

U.S. PATENT DOCUMENTS

| | | | | |
|---|---|---|---|---|
| 2002/0096204 A1* | 7/2002 | Lin | .................... | A45B 19/04 |
| | | | | 135/25.4 |
| 2005/0242610 A1* | 11/2005 | Galindo | ................ | B60J 11/08 |
| | | | | 296/95.1 |
| 2006/0219278 A1* | 10/2006 | Lohman | ............... | A45B 11/00 |
| | | | | 135/16 |

* cited by examiner

VEHICLE SUN SHIELD

CROSS REFERENCE TO RELATED APPLICATIONS

This application is entitled to the benefit of provisional patent application No. 62/141,357 filed on Apr. 1, 2015, the specification of which is incorporated herein by reference.

BACKGROUND OF THE INVENTION

The present invention relates to a shield for protecting a vehicle interior from harmful ultraviolet radiation.

DESCRIPTION OF THE PRIOR ART

In warmer areas, prolonged sunlight exposure can severely damage a vehicle interior and can increase the temperature within the passenger compartment to an unbearable level. A conventional sun shield is formed of a pleated, cardboard sheet that is placed against the windshield when a vehicle is parked to block incoming sunlight. However, the fragile cardboard shields must be replaced frequently and are only marginally effective. More durable shields include support frames that are difficult to assemble and which occupy significant storage space.

Accordingly, there is currently a need for a vehicle sun shield that is more effective and durable than conventional sun shields. The present invention addresses this need by providing an umbrella-type shield having a highly reflective, ovate canopy that fits within and substantially overlays a vehicle windshield.

SUMMARY OF THE INVENTION

The present invention relates to a vehicle sun shield comprising an elongated, length-adjustable shaft having a collar slidably mounted thereon that expands a plurality of support ribs and an overlaying, reflective canopy. Accordingly, a user adjusts the shaft to a desired length and fully expands the canopy. The canopy is positioned immediately adjacent to the windshield interior with a lower end resting on the vehicle console or on the upper surface of the dashboard.

It is therefore an object of the present invention to provide a sun shield for protecting a vehicle interior from harmful ultraviolet radiation.

It is therefore another object of the present invention to provide a vehicle sun shield that is compactly collapsible for storage.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
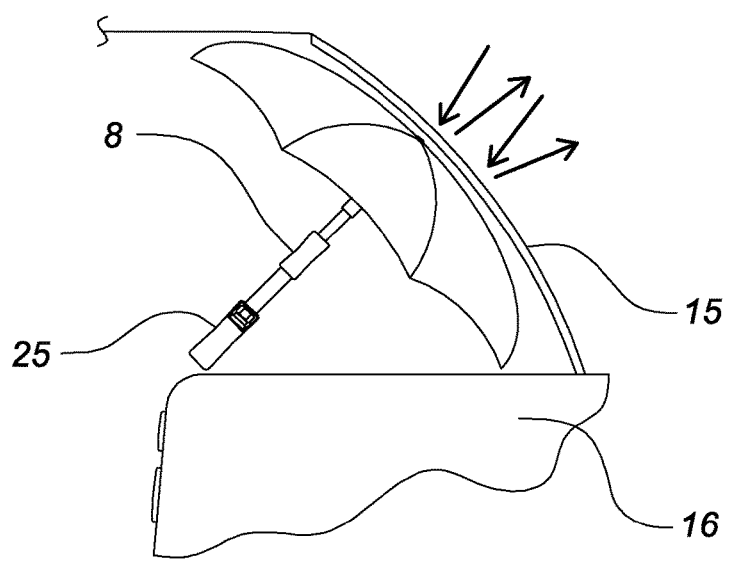
FIG. 1 depicts the vehicle sun shield according to the present invention properly installed within a vehicle.
Figure 2:
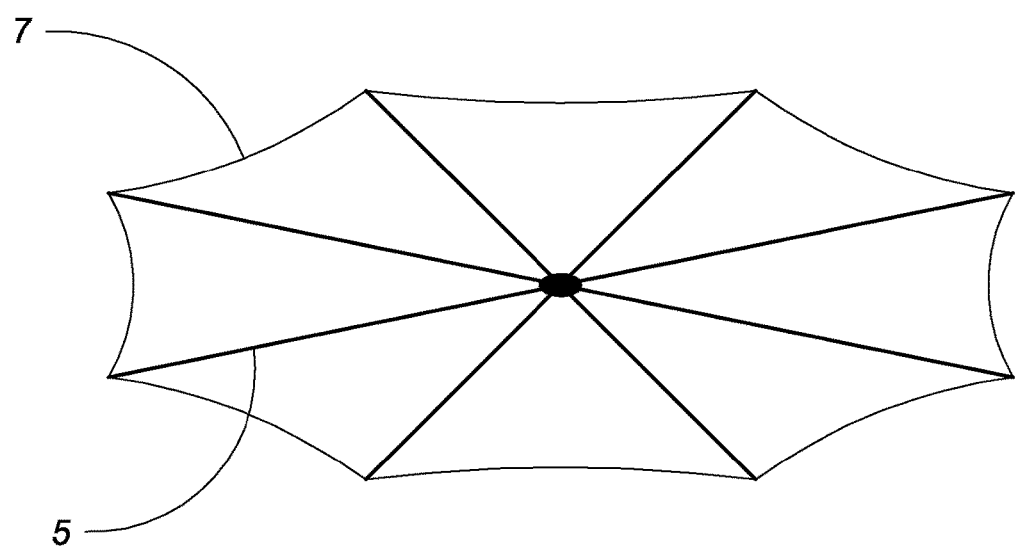
FIG. 2 is an expanded, plan view of the canopy.
Figure 3:
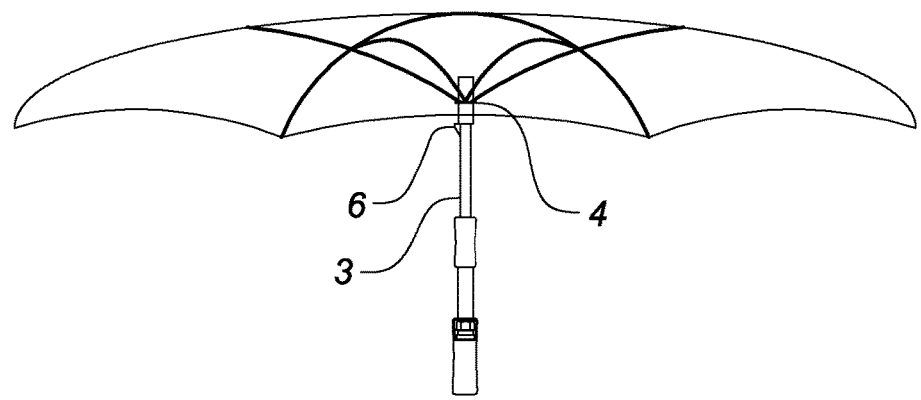
FIG. 3 is a front, plan view of the vehicle shield with the canopy and support ribs fully deployed.
Figure 4:
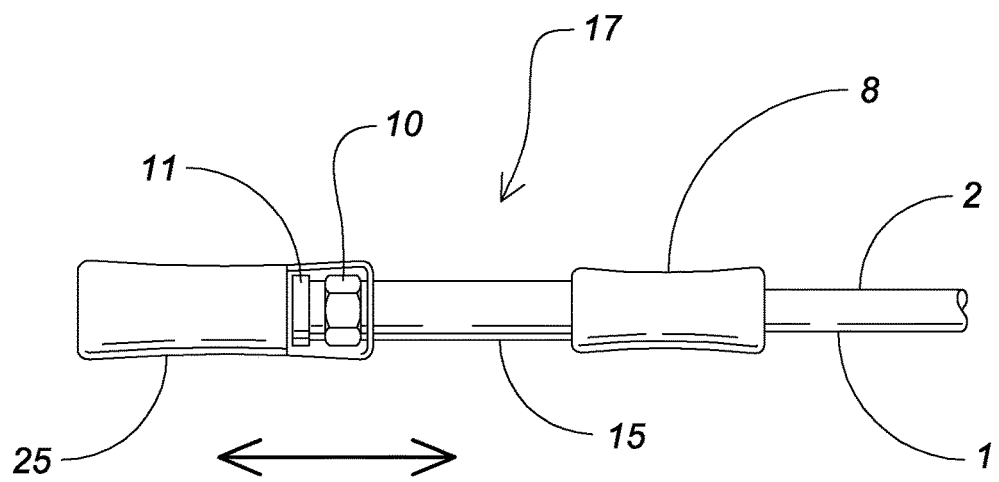
FIG. 4 is an isolated view of the extendable handle.

The present invention relates to a vehicle sun shield comprising an elongated shaft 1 having an upper end, a lower end 2 and an intermediate portion 3 therebetween. Slidably mounted on the intermediate portion is a collar 4 having a plurality of support ribs 5 radially extending therefrom. As the collar is slid upwardly, the ribs expand outwardly from the shaft in a conventional fashion. The ribs may be secured in the expanded position by sliding the collar into engagement with a locking pin 6. When the locking pin is released, the sleeve can be lowered to collapse the ribs against the shaft.

The ribs structurally support a canopy 7 constructed with an aluminum, metalized, polyester fabric that will reflect 97% of UV and IR light rays. When expanded, the canopy and ribs form an ovate shield that is dimensioned and configured to substantially correspond to the shape and dimension of a designated windshield 15.

At a lower end of the shaft is an extendable handle mechanism 17 for adjusting the effective length of the shaft to rest against various surfaces within a vehicle passenger compartment. The handle mechanism includes an upper handgrip 8 fixedly attached to the lower end of the shaft with a rod 15 depending therefrom. The rod is telescopically received within a lower handgrip 25 allowing the length of the handle mechanism to be selectively adjusted. An exposed compression nut 10 within the lower handgrip is tightened to fix the rod at a select position. A flange 11 at a distal end of the rod, adjacent to the compression nut, prevents the shaft and lower handgrip from separating.

Accordingly, a user adjusts the handle mechanism to a desired length and fully expands the canopy. The ovate canopy is positioned immediately adjacent to the windshield interior with the lower handgrip resting on the vehicle console, the upper surface of the dashboard 16 or another support surface within the passenger compartment. When the shield is no longer needed, the shaft and canopy can be compactly collapsed and stored within an accompanying sleeve.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A vehicle sun shield comprising:
   an elongated shaft having an upper end, a lower end and an intermediate portion therebetween;
   a collar slidably mounted on the intermediate portion of said shaft, said collar having a plurality of support ribs radially extending therefrom, said ribs moving between an expanded position wherein said ribs form an ovate configuration, and a collapsed position with said ribs resting against said shaft, when said collar is axially translated relative to said shaft;
   a canopy overlaying said support ribs, said canopy constructed with an ultraviolet-light-reflective material, said canopy having an ovate shape and dimension that is adapted to be substantially equal to a shape and dimension of a designated windshield when the ribs are in the expanded position;
   a length-adjustable handle at the lower end of said shaft, wherein said length-adjustable handle comprises an upper handgrip attached to the lower end of said shaft, a rod attached to a lower end of said upper handgrip and a hollow, lower handgrip telescopically receiving a lower end of said rod whereby said rod can be extended and retracted within said lower handgrip to adjust a length of said handle.

2. The vehicle sun shield according to claim 1 wherein said canopy is constructed with an aluminum, metalized, polyester fabric.

3. The vehicle sun shield according to claim 1 further comprising a locking pin on said shaft for fixing said support ribs in the expanded position.

4. The vehicle sun shield according to claim 1 further comprising a compression nut within said lower handgrip that releasably fixes said rod at a select position within said lower handgrip.

5. The vehicle sun shield according to claim 4 further comprising a flange at the lower end of said rod that prevents the rod and lower handgrip from separating.

6. In combination with a vehicle having an interior passenger compartment and a windshield, said windshield having an interior surface, an exterior surface and a predetermined size and geometrical configuration, a sun shield comprising:

an elongated shaft having an upper end, a lower end and an intermediate portion therebetween, the lower end of said shaft resting on a support surface in the interior passenger compartment;

a collar slidably mounted on the intermediate portion of said shaft, said collar having a plurality of support ribs radially extending therefrom, said ribs moving between an expanded position wherein said ribs form an ovate configuration, and a collapsed position with said ribs resting against said shaft, when said collar is axially translated relative to said shaft;

a canopy overlaying said support ribs and positioned adjacent to the interior surface of said windshield, said canopy constructed with an ultraviolet-light-reflective material, said canopy having an ovate shape and dimension that substantially equals the predetermined size and geometrical configuration of said windshield when the ribs are in the expanded position to block sunlight;

a length-adjustable handle at the lower end of said shaft, wherein said length-adjustable handle comprises an upper handgrip attached to the lower end of said shaft, a rod attached to a lower end of said upper handgrip, and a hollow, lower handgrip telescopically receiving a lower end of said rod whereby said rod can be extended and retracted within said lower handgrip to adjust a length of said handle.

7. The vehicle sun shield according to claim 6 further comprising a compression nut within said lower handgrip that releasably fixes said rod at a select position within said lower handgrip.

8. The vehicle sun shield according to claim 6 further comprising a flange at the lower end of said rod that prevents the rod and lower handgrip from separating.

\* \* \* \* \*